Jan. 8, 1963 J. S. COOK 3,072,861

NOISE REDUCTION IN PARAMETRIC AMPLIFIER

Filed May 2, 1960

INVENTOR
J. S. COOK
BY David P. Kelley
ATTORNEY 3,072,861

NOISE REDUCTION IN PARAMETRIC AMPLIFIER

John S. Cook, New Providence, N.J., assignor to Bell Telephone Laboratories, Incorporated, New York, N.Y., a corporation of New York Filed May 2, 1960, Ser. No. 26,111
5 Claims. (Cl. 330—43)

This invention relates to high frequency electron discharge devices and, more particularly, to velocity modulation devices which utilize the principles of parametric amplification.

Velocity modulation devices such as the traveling wave tube have proven capable of amplification with reasonably high efficiency and stability over a very wide band of frequencies. Detracting from the significant advantages realized by such devices, however, is the noise resulting from the utilization of an electron beam.

The conventional traveling wave tube achieves electromagnetic signal wave amplification through space-charge wave modulation on an electron beam. Any space-charge wave which inherently exists on the beam, or is introduced onto the beam through modulation by some outside source, may propagate along the beam at either of at least two phase velocities. It can be shown that the faster of these phase velocities at any given frequency is higher than the mean or D.-C. velocity of the modulated beam, whereas the slower phase velocity is lower than the beam's D.-C. velocity. The range of phase velocities which represents space-charge wave propagation at a velocity higher than a D.-C. velocity will be referred to as the fast space-charge mode, while those phase velocities which represent wave propagation at a velocity lower than the D.-C. velocity will be referred to as the slow space-charge mode. Another characteristic of the beam is its dispersion; in the fast mode, space-charge wave velocities vary inversely with frequency.

A conventional traveling wave tube effects amplification through electromagnetic signal wave interaction with the slow space-charge mode of the electron beam, as is well known. The unique characteristics of the slow space-charge mode which permit wave amplification are disadvantageous in that spurious noise power which is inherent on the slow mode of the beam cannot be extracted by ordinary methods. This is due to the equally well-known fact that power transmitted in a slow space-charge mode is negative in that the presence of such a wave results in a decrease in total beam power.

In the Patent of C. F. Quate, No. 2,974,252, granted March 7, 1961, there is disclosed a completely different approach to the problem of reducing noise in a beam device. By making use of the principles of parametric amplification, the Quate device effects interaction between the signal wave and the beam's fast space-charge mode thereby achieving desired amplification of the signal. Because fast mode noise power is at a higher level than the D.-C. beam power, it can be extracted from the beam through any of a number of well-known devices.

In the Quate device, energy for signal wave amplification is ultimately derived from a source of pump energy which is at a higher frequency than the signal energy. When the pump frequency energy is mixed on the beam with the signal frequency energy, a lower sideband "idler" frequency wave is produced which is of a frequency equal to the difference of the frequencies of the pump and signal waves. Under certain conditions, strong "active" coupling may be induced between the fast mode signal and idler frequency waves, which coupling is similar to the wave interaction which takes place between the slow and circuit modes of a conventional traveling wave tube. In the Quate device, however, substantially all of the inherent noise power within a predetermined bandwidth can be stripped from the beam mode in which amplification takes place, that is, the fast space-charge mode.

Although the Quate device offers obvious low noise advantages over the conventional traveling wave tube, certain deleterious second-order effects have become apparent. Devices such as resonant cavities or Kompfner-Dip helices, which can be used for extracting or "stripping" fast mode noise energy, inherently present limited bandwidth characteristics and can therefore be effective in removing only a limited range of frequencies which, of course, corresponds to the bandwidth of the signal frequencies to be amplified. It has been found, however, that certain noise frequencies above the signal band unfortunately tend to couple inseparably with the signal wave.

For purposes of illustration, the mixing of the pump and signal frequency waves can be considered as being analogous to the mixing of carrier and frequency waves in the familiar case of amplitude modulation. The "first lower sideband" frequency wave is the aforementioned idler wave which actively couples to the signal wave to provide parametric amplification. A spectrum of higher frequency waves is also produced by the mixing of signal and pump frequencies and, inasmuch as these frequencies correspond to those produced through amplitude modulation, they will be referred to as "upper sideband" frequency waves. The first upper sideband frequency is equal to the signal frequency plus the pump frequency; the second upper sideband frequency is equal to the first upper sideband frequency plus the pump frequency; the third upper sideband frequency is equal to the second upper sideband frequency plus the pump frequency; an entire progression of upper sideband waves is produced, each having a frequency equal to that of the next lower upper sideband frequency plus the pump frequency. It has been found that each of these waves couples together successively according to frequency and that the first upper sideband wave couples with the signal wave; hence, all of the upper sideband frequency waves are effectively coupled to the signal wave and, consequently, the inherent beam noise power at these frequencies is effectively coupled to the signal wave. Further, another spectrum of upper sideband frequency waves is produced through the mixing of the pump and idler waves. These waves couple, in the same manner mentioned previously, to the idler wave and therefore noise of these frequencies also appears at the output of the tube. For purposes of convenience, these two spectra of upper sideband waves will be referred to, respectively, as the signal upper sideband and the idler upper sideband.

Besides the coupling of noise to the signal wave, the presence of upper sideband frequency waves results in other deleterious effects. The coupling of sideband waves reduces the effect of the pump power necessary to produce parametric amplification. Hence, a greater quantity of pump energy must be introduced onto the beam; this, however, results in high power pump harmonic frequencies which, in turn, may produce parametric amplification of the upper sideband frequency waves.

The deleterious effects of the upper sideband frequency waves can be substantially eliminated through the use of an auxiliary slow wave structure which couples solely to the first upper sideband frequency waves as described in the patent of A. Ashkin, J. S. Cook, W. H. Louisell and C. F. Quate, No. 2,958,001, granted October 25, 1960. This device is used to shift the phase velocities of the first upper sideband frequency waves to put them so far out of synchronism with the signal and idler waves that effective coupling thereto is substantially eliminated. Since coupling between all of the upper sideband frequency waves is successive according to frequency, elimination of the effects of the first upper sideband frequency waves results in the elimination of the effects of all the upper sideband frequency waves.

A limitation to the practical applications of the Ashkin et al. slow wave structure is the mechanical difficulties which arise in its fabrication. In order to prevent coupling of the slow wave structure to the signal pump and idler frequency waves of the beam, appropriate stop bands must be built into the structure. Since the first upper sideband frequency is related to the pump and signal frequencies, the inclusion of these stop bands requires very precise mechanical construction.

It is a general object of this invention to eliminate the effects, on the output signal, of noise power in the electron beam of a velocity modulation device.

It is a specific object of this invention to eliminate the effects, on the output signal, of upper sideband frequency noise power in the electron beam of a parametric amplifier.

It is a corollary object of this invention to prevent the first upper sideband frequency waves on the electron beam of a parametric amplifier from effectively coupling to the parametrically growing signal wave.

These and other objects of this invention are attained in an illustrative embodiment thereof which comprises an electron discharge device having an electron gun for projecting an electron beam and a collector at opposite ends of an evacuated envelope. A device such as a Kompfner-Dip helix or a cavity resonator is positioned along the beam path between gun and collector for extracting fast mode noise energy from the beam. A signal wave and a pump wave are then coupled to the fast mode of the beam where they are allowed to mix in an interaction region between the noise extraction apparatus and the collector. The signal wave is thereby parametrically amplified in the same general manner as described in the aforementioned Quate application. The mixing of the pump and signal waves also produces upper sideband frequency waves on the beam which are potentially degrading for the reasons given above.

This invention is based on the discovery that the strength of coupling between the parametrically growing wave and upper sideband frequency waves is a function of the difference in velocities of the pump wave and the upper sideband frequency waves. In the aforementioned Quate device, this difference is not very great and, hence, the degrading coupling is quite strong. Accordingly, it is an aspect of this invention that pump energy be propagated in coupling relationship with the beam at a velocity which is much different than the velocities of the upper sideband frequency waves.

It is a feature of this invention that the pump wave be propagated in coupling relationship with the beam by a slow wave circuit which is so constructed that the phase velocity of the circuit pump wave exceeds that of the uncoupled fast signal mode velocity of the beam. Due to the dispersion of the beam, the uncoupled phase velocity of a fast space-charge wave at the pump frequency is lower than that of an uncoupled fast space-charge wave at the signal frequency. Further, the upper sideband frequency waves travel at a lower velocity than the fast pump mode. When the circuit pump wave is propagated as described above, at least two normal coupling modes representing possible propagation velocities of the pump wave are produced. One of these coupling modes is at a higher velocity than that of the circuit pump wave and will be referred to as the in-phase normal pump mode; the other is at a lower velocity than that of the uncoupled pump frequency fast space-charge mode and will be referred to as the out-of-phase normal pump mode. It is another feature of this invention that only the in-phase normal pump mode be excited. Consequently, the phase velocity of the coupled pump wave is made to be higher than the velocity of the uncoupled circuit pump wave, and therefore is much higher than the velocities of the upper sideband frequency waves. The desired velocity separation between the pump wave and upper sideband waves having been effected, it is necessary now to consider the conditions which must obtain to produce the necessary coupling for parametric amplification.

It is a feature of one embodiment of this invention that the signal wave be propagated on the aforementioned slow wave circuit, and further, that the circuit be so constructed that the signal wave propagate at a velocity which is substantially equal to the in-phase normal pump wave velocity plus the difference in velocities of this coupled pump wave and the uncoupled fast idler frequency space-charge mode. As will be explained more fully hereinafter, these conditions produce the active coupling between the idler wave and signal wave which is necessary for parametric amplification.

It is a feature of another embodiment of this invention that the signal wave energy be entirely transferred to the beam prior to the introduction of pump wave energy, and further, that the aforementioned slow wave circuit be so constructed that idler frequency wave energy travel thereon at an uncoupled velocity substantially equal to that of the coupled pump wave plus the difference in velocities of the coupled pump wave and the uncoupled fast signal space-charge mode. As will be seen presently, this apparatus also produces high amplification of the signal wave while eliminating the effects of noise at the upper sideband frequencies.

These and other objects and features of the present invention will be more fully appreciated with a consideration of the following detailed description, taken in conjunction with the accompanying drawing in which.

Figure 1:
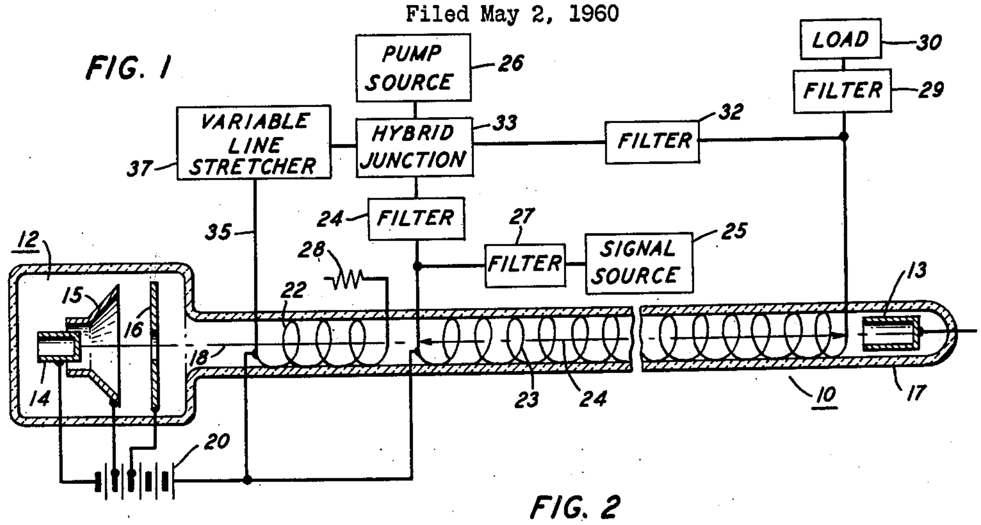
FIG. 1 is a schematic view of one illustrative embodiment of this invention.

The specific illustrative embodiment of FIG. 1 comprises a traveling wave tube 10 having an electron gun 12 and a collector 13 at opposite ends of an evacuated envelope 17. For purposes of illustration, electron gun 12 is shown as comprising a cathode 14, a beam forming electrode 15, and an accelerating elecrtode 16, which jointly coact to form and project an electron beam, schematically shown as 18, toward the collector 13. Battery 20 maintains the various electrodes at proper predetermined potentials as is well known in the art. Suitable means for focusing the beam are used which, because they are well known in the art, and for purposes of simplicity, have not been shown.

Electron beam 18 is characterized by two modes of propagation at any given frequency: a fast velocity space-charge mode and a slow velocity space-charge mode hereinafter referred to, respectively, as the fast mode and the slow mode. Another characteristic of the beam is its dispersion; that is, the phase velocity of any space-charge wave propagating thereon will vary with frequency. As is well known, waves which propagate in the fast mode have a higher phase velocity than the mean, or D.-C., velocity of the beam, while those propagating in the slow mode are of a lower phase velocity. Also characteristic of the beam are its inherent current density fluctuations. These fluctuations give rise to spurious space-charge waves, hereinafter referred to as noise waves, which propagate at velocities representing virtually all frequencies in both the fast and slow modes.

Downstream from the electron gun, that is, at a point closer than the electron gun to the collector, is a noise extracting helix 22. Downstream from helix 22 is a helix 23 for propagating signal wave energy which is applied thereto from a signal source 25 and pump energy applied thereto via a hybrid junction 33 from a pump source 26. Pump frequency bandpass filter 24 prevents signal energy from being transmitted to hybrid junction 33 while signal frequency bandpass filter 27 prevents pump energy from being transmitted to signal source 25. Helix 23 defines an interaction region 24 wherein the electromagnetic signal and pump waves interact with the beam. More specifically, the pump energy induces strong active coupling between the signal energy from source 25 and the fast idler mode of the beam, as will be more fully explained presently; the term fast idler mode denotes beam energy having a frequency equal to the difference of the pump and signal frequencies and traveling in the fast space-charge mode of the beam. Noise extraction helix 22 is constructed according to the well-known Kompfner-Dip principle, to extract substantially all of the fast idler mode noise energy from the beam and transmit it to a dissipative impedance 28. This avoids the introduction of idler frequency noise to the aforementioned parametrically growing signal wave. It should be pointed out that elements 22 and 23 have been shown as being helices for illustrative purposes only; various other noise extraction means and slow wave circuits could alternatively be used.

After being amplified, the signal wave is transmitted, via signal frequency bandpass filter 29, to an appropriate load 30. Pump wave energy is transmitted, via pump frequency bandpass filter 32, back to the hybrid junction 33. Hybrid junction 33 channels pump energy from source 26 and filter 32 to slow wave helix 23. Filter 29 prevents pump wave energy from being transferred to load 30, while filter 32 prevents signal wave energy from being transmitted to hybrid junction 33. A relatively small quantity of pump power is delivered via hybrid junction 33 to noise extraction helix 22. The quantity of pump power so delivered is limited by proper adjustment of hybrid junction 33, as is known in the art, while the phase of the pump wave on helix 22 is controlled by a variable line stretcher 37, as will be explained hereinafter.

In the aforementioned patent of Ashkin et al., parametric amplification is analyzed from the "coupled mode" point of view. This method of analysis is useful in gaining a physical understanding of the rather complicated phenomenon of space-charge wave parametric amplification. As is pointed out therein, an electron beam can be considered as being an electromechanical transmission line, and, as such, other transmission lines can be coupled thereto inductively or electrically. This "ordinary" coupling will be referred to as passive coupling. In addition, two waves may couple in such a way as to produce growth, or amplification, of the coupled wave. This "extraordinary" coupling is referred to as active coupling and is the type of coupling that takes place between the slow space-charge mode and the forward circuit mode in the conventional traveling wave tube to produce amplification. Active coupling in the fast mode can take place only through the provision of beam parametric variations as are produced by a pump frequency wave. The mixing on the beam of the signal wave with the higher frequency pump wave defines an idler wave having a frequency equal to the difference in frequencies of the pump wave and the signal wave. Under certain conditions, active coupling can be induced between the fast mode signal wave and the fast mode idler wave, thereby producing growth of the coupled wave.

When waves on two dispersive transmission lines are coupled passively, they can be regarded as a single coupled wave which will ordinarily travel at a velocity which is either higher or lower than either of the uncoupled waves, depending upon the additive or subtractive effect of mutual inductance or capacitance. The higher velocity will be referred to as the in-phase normal mode since it ordinarily results from in-phase coupling between the two waves while the lower velocity will be referred to as the out-of-phase normal mode because it results from coupling which is 180 degrees out-of-phase. In the case of an electron beam, this coupling action is somewhat more complex due to the presence of both fast and slow space-charge modes. For purposes of this discussion, however, only fast mode beam propagation will be considered, and any effects of the slow mode will be neglected.

Figure 2:
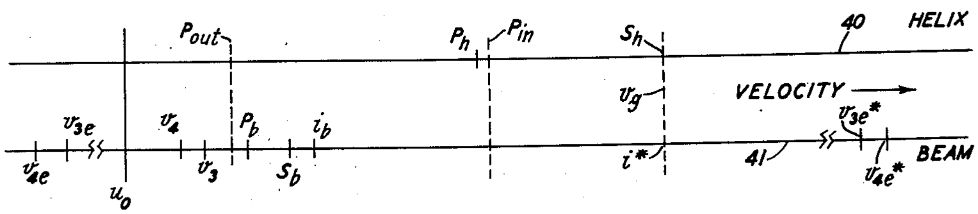
FIG. 2 is a graph illustrating the correlation of velocity spectra which may exist, respectively, on the slow wave circuit and electron beam of the device of FIG. 1.

Referring now to FIG. 2, graph 40 illustrates the spectrum of phase velocities of waves which may propagate along helix 23 of the device of FIG. 1, while graph 41 is a velocity spectrum of space-charge waves which may propagate on beam 18. Both graphs are one-dimensional, are of the same scale, and show increasing phase velocity from left to right as indicated by the arrow labeled "velocity." The D.-C. velocity $u_0$ of the electron beam is used as a reference for both graphs because all fast mode space-charge waves travel at a faster velocity than $u_0$.

Considering graph 41, $p_b$, $s_b$, and $i_b$ represent the uncoupled phase velocities of space-charge waves of the pump, signal, and idler waves, respectively. More specifically, they can be termed the fast pump, signal, and idler space-charge modes since they represent the velocities at which space-charge waves of these frequencies would travel on the beam if they were unaffected by helix 23. With reference to graph 40, $p_h$ and $s_h$ are the pump and signal slow wave circuit modes and they represent the velocities at which the pump wave and signal wave, respectively, would travel along helix 23 if they were unaffected by beam 18.

As mentioned previously, energy at the idler frequency wave results from the mixing on the beam of pump frequency energy and signal frequency energy. This mixing also results in the production of two series of upper sideband frequency waves. The first upper sideband frequency $\omega_3$, of one of these series, is equal to the sum of the signal and pump frequencies; the second upper sideband frequency of this series, $\omega_5$, is equal to the sum of the pump and first upper sideband frequencies; the third upper sideband frequency, $\omega_7$, is equal to the sum of the pump and the second upper sideband frequencies. The other series of upper sideband frequencies, $\omega_4, \omega_6, \omega_8 \ldots$, are likewise determined by first adding the pump frequency and the idler frequency, and then successively adding the value of the pump frequency to determine each successive upper sideband frequency. The series represented by odd-numbered subscripts will be referred to as the signal upper sideband because it tends to couple with the signal wave; the even-numbered series tends to couple with the idler wave and will be referred to as the idler upper sideband. Inasmuch as velocity varies inversely with frequency in the fast space-charge mode, all of the upper sideband waves travel at a slower velocity than either the uncoupled pump or signal modes.

The upper sideband waves can be a serious source of noise in that, in the absence of modification, they are ultimately coupled to the parametrically growing wave. It can be shown that all of the upper sideband waves couple successively according to frequency; for example, $\omega_7$ couples with $\omega_5$ and $\omega_5$ couples with $\omega_3$. If the first signal upper sideband, $\omega_3$, couples with the signal wave, noise at all of the signal upper sideband frequencies may appear at the output with the amplified signal wave. Likewise, if $\omega_4$ couples with the idler wave, noise at all of the idler upper sideband may appear at the output. Further, it is impossible to extract all of this upper sideband noise because, as pointed out before, noise extraction apparatus such as helix 22 is effective only over a limited bandwidth. The success of the present invention lies in the prevention of coupling between the first upper sideband frequency waves and the parametrically growing signal wave, as will be explained hereinafter. The velocities of these waves are shown on graph 41, $v_3$ being the velocity of $\omega_3$ and $v_4$ being the velocity of $\omega_4$.

I have found that the strength of coupling between the upper sideband frequency noise waves at velocities $v_3$ and $v_4$ varies inversely with difference of the coupled pump wave velocity and the velocities $v_3$ and $v_4$ of the first upper sideband waves. The following description of the parametric amplification process in device 10 will illustrate how such a velocity separation can be attained while still fulfilling the conditions for parametric growth of the signal wave.

As the pump wave propagates along helix 23, it couples with the fast pump space-charge mode $p_b$ to produce an out-of-phase pump mode $P_{out}$ and an in-phase pump mode $P_{in}$. As mentioned previously, a small quantity of pump energy is transferred to the beam via line stretcher 37 and helix 22. The purpose of this procedure is to insure the excitation of the in-phase normal pump mode $P_{in}$, to the exclusion of the out-of-phase pump mode $P_{out}$. The pump energy transferred to the beam by helix 22 travels along the beam at the velocity $p_b$ until it couples with the pump circuit mode $p_h$. By varying the effective length of transmission line 35 by means of variable line stretcher 37, one can control the phase at which the pump energy on the beam enters interaction region 24. By this means, in-phase coupling is produced between the pump waves on the beam and helix, and the coupled pump wave is thereby caused to propagate at the velocity represented by $P_{in}$. It should be pointed out that, for many applications, the transfer of pump energy to the beam via a variable line stretcher is unnecessary; the out-of-phase normal mode $P_{out}$ travels at a velocity that differs so widely from that of the circuit pump wave $P_h$ that possible excitation of $P_{out}$ can often be neglected.

As seen by the position of $s_h$, the uncoupled phase velocity of the signal wave on helix 23 is substantially equal to the velocity of the coupled pump wave plus the difference in velocities of the coupled pump wave and the uncoupled fast idler mode. In the terminology of FIG. 2:

$$s_h = P_{in} + (P_{in} - i_b) \qquad (1)$$

Because of the wide separation between the circuit signal wave velocity $s_h$ and the fast signal space-charge mode velocity $s_b$, coupling therebetween can be neglected. For this reason it is unnecessary to extract noise from the fast signal mode.

The process of parametric amplification in a velocity modulation device is very complex and is not susceptible to concise, thorough explanations in physical terms. As pointed out above, it can be shown that a parametrically growing wave results from active coupling between the signal wave and the idler wave. For purposes of analyzing this coupling, the idler frequency energy can be considered as propagating at velocities $i_b$ and $i^*$ which are symmetrically disposed about the pump wave velocity $P_{in}$. It can be shown that the signal wave energy $s_h$ "sees" the idler wave energy as propagating at its "image" velocity $i^*$. Inasmuch as $s_h$ and $i^*$ coincide, active coupling therebetween is advantageously strong and therefore favorable for producing parametric amplification. The parametrically growing signal wave will propagate at velocity $v_g$, which is at substantially the same velocity as $s_h$ and $i^*$.

The foregoing discussion has illustrated one method of producing parametric amplification which is consistent with a desired separation between the coupled pump wave velocity $P_{in}$ and the first upper sideband frequency velocities $v_3$ and $v_4$. As pointed out previously, such a large velocity separation weakens coupling between the upper sideband waves and the parametrically growing wave to such an extent that it can be neglected. More specifically, I have found that the idler wave traveling at velocity $i_b$ "sees" the first idler upper sideband wave as if it propagated at a velocity given by:

$$v_{4e} = P_{in} - \frac{\omega_4}{\omega_i}(P_{in} - v_4)$$

where $v_{4e}$ is the "effective" phase velocity of the first idler upper sideband; in other words, the coupling of the first idler upper sideband wave with the fast idler mode in the presence of the pump wave is the same as the coupling which would occur between the fast idler mode at velocity $i_b$ and idler upper sideband energy at effective velocity $v_{4e}$ in the absence of the pump wave. Hence, as the quantity $$\frac{\omega_4}{\omega_i}(P_{in} - v_4)$$

becomes larger, coupling between the idler wave and the first idler upper sideband wave becomes smaller. From the discussion with reference to FIG. 2, one can appreciate that this quantity can successfully be made very large.

An analogous equation illustrates the strength of coupling between the first idler upper sideband frequency energy and the image idler wave which travels at velocity $i^*$.

$$v_{4e}^* = P_{in} + \frac{\omega_4}{\omega_i}(P_{in} - v_4)$$

where $v_{4e}^*$ is the effective velocity of the first idler upper sideband wave as seen by the image idler wave. Again, a large difference in velocities of the coupled pump wave and the first idler upper sideband wave effectively eliminates degrading coupling. The approximate velocities $v_{4e}$ and $v_{4e}^*$ have been shown on graph 41 to illustrate that the effective velocities of the first idler upper sideband waves and the idler waves are so far out of synchronism with each other that coupling therebetween can be neglected.

With reference to the first signal upper sideband frequency waves, it can be shown that they are also effectively shifted in velocity with respect to the signal wave. Letting $v_{3e}$ be the effective velocity of the first signal upper sideband frequency wave which the fast signal mode sees, and $v_{3e}^*$ be the velocity of the first signal upper sideband wave which the image signal wave sees, it can be shown that:

$$v_{3e} = P_{in} - \frac{\omega_3}{\omega_s}(P_{in} - v_3)$$

$$v_{3e}^* = P_{in} + \frac{\omega_3}{\omega_s}(P_{in} - v_3)$$

The nature of the image signal wave will be discussed hereinafter. The relative velocities of $v_{3e}$ and $v_{3e}^*$ are also shown on graph 41.

At this point, a brief discussion of certain practical considerations concerning the device of FIG. 1 is perhaps warranted. As compared with parametric amplifiers of the prior art, it can be appreciated that the present device is capable of amplification with an extremely small noise figure because of the elimination of the upper sideband problem. The pump power requirements, however, might be slightly higher for two reasons. First, the noise extraction helix 22 is designed to achieve complete transfer of energy from the beam to the helix at the idler frequency. It is therefore relatively inefficient for transferring pump frequency energy to the beam. Because such transfer of pump energy is merely for the purpose of exciting the in-phase normal pump mode, the quantity so transferred can be extremely small and, hence, the inefficiency of the transfer is usually of little import. Secondly, the greater the difference in velocities of the circuit pump wave $p_h$ and the uncoupled fast pump frequency space-charge mode $p_b$, the weaker the coupling therebetween will be. A compromise must therefore be made whereby $p_h$ is close enough to $p_b$ to permit the formation of a fairly strong normal pump mode at velocity $P_{in}$, while obtaining a sufficient separation between $P_{in}$ and $v_3$, $v_4$ to eliminate the effects of the upper sideband frequency waves. These considerations should, of course, be borne in mind in determining whether the present device is more desirable for a specific application than, say, the aforementioned Ashkin et al. device.

Figures 3, 4:
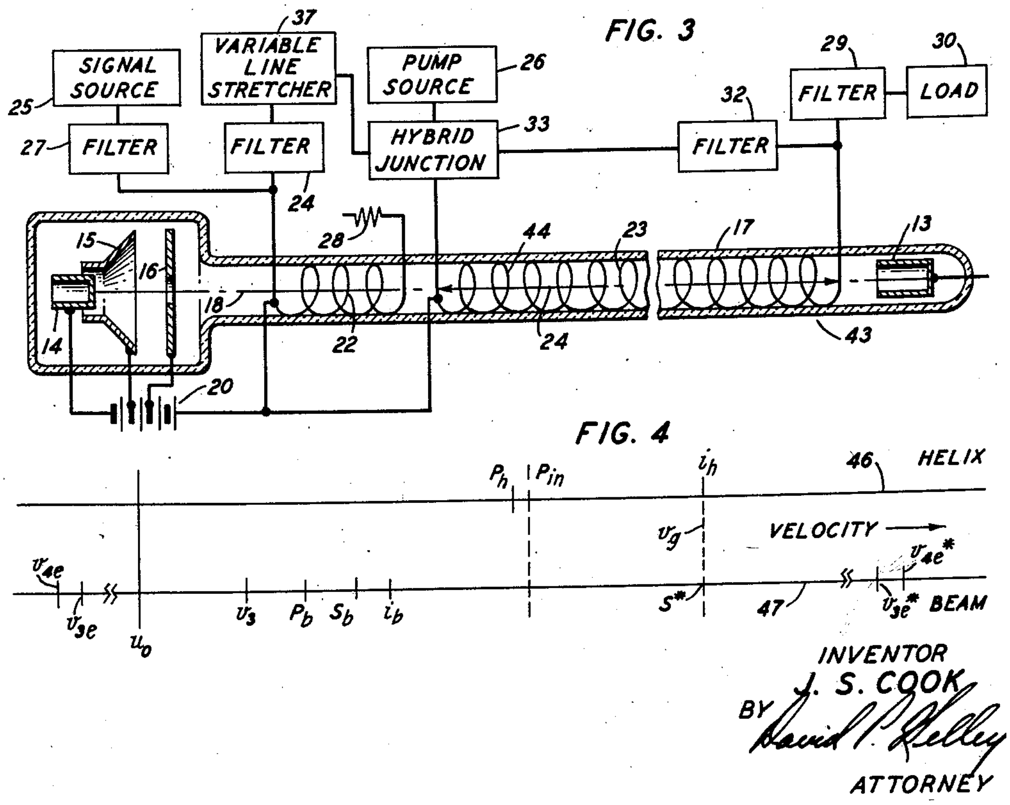
FIG. 3 is a schematic view of another illustrative embodiment of this invention.
FIG. 4 is a graph illustrating the correlation of velocity spectra which may exist, respectively, on the slow wave circuit and electron beam of the device of FIG. 3.

Referring now to FIG. 3, there is shown another embodiment of my invention comprising a traveling wave tube 43 having structural elements which correspond to those of the device of FIG. 1 and which are referenced accordingly. Helix 44, which extends along interaction region 24, may be identical with helix 23 of FIG. 1, or it may have slightly different characteristics as will be explained hereinafter. Rather than being coupled to helix 44, signal source 25 is coupled via signal bandpass filter 27 to noise extraction helix 22. The signal wave energy is thereby transferred completely to the beam together with a small quantity of pump energy from source 26 via hydrid junction 33, variable line stretcher 37, and pump bandpass filter 24. Because the signal energy travels on the beam in this embodiment, helix 22 is designed to remove fast signal mode noise from the beam, rather than idler noise.

Referring now to FIG. 4, graphs 46 and 47 illustrate the relative velocities of waves in tube 43 and correspond, respectively, to graphs 40 and 41 of FIG. 2. As in the device of FIG. 1, the phase of the pump space-charge wave at velocity $p_b$ is adjusted such that only the in-phase normal pump mode $P_{in}$ is excited. Before interaction takes place, the signal energy travels solely on the beam at velocity $s_b$. Helix 44 is so constructed that idler frequency energy travels at an uncoupled velocity $i_h$ equal to the coupled pump wave velocity plus the difference in velocities of the coupled pump wave and the fast signal space-charge wave velocity. In other words:

$$i_h = P_{in} + (P_{in} - s_b)$$

It can be shown that the circuit idler wave will "see" the signal wave as traveling at its image velocity $s^*$. The image signal velocity and the uncoupled signal velocity $s_b$ will be symmetrically disposed about the coupled pump wave velocity $P_{in}$. Circuit idler energy will therefore couple with beam signal energy to produce a parametrically growing wave at velocity $v_g$ which is substantially equal to $i_h$ and $s^*$. Again, we see that the conditions of parametric amplification are fulfilled while obtaining a large velocity difference between the coupled pump wave and the first upper sideband frequency waves at velocities $v_3$ and $v_4$.

It is clear from the foregoing that the intended functioning of my invention depends on the relative velocities of the various waves on the slow wave circuit with respect to the waves on the beam. As is well known, the velocities of helix waves are primarily a function of the helix winding pitch angle. Helix dispersion, and hence the separation in velocity of the various helix waves, is primarily a function of the helix diameter and dielectric loading. Generally, a helix can also be made highly dispersive by providing discontinuities at regular intervals therealong. Inasmuch as various other types of slow wave circuits, such as coupled resonators, et cetera, could be used in lieu of the helices shown, a more thorough discussion of helix parameters will not be included.

In parametric amplifiers, it is generally advantageous that the pump frequency be about twice the signal frequency, in which case the signal and idler frequencies are about equal. If this condition prevails in the devices of FIGS. 1 and 3, it can be seen that their respective slow wave circuits, 23 and 44, can be identical (when the idler frequency equals the signal frequency, $s_b$ equals $i_b$ and $s_h$ equals $i_h$). This condition has not been illustrated because the present invention is not intended to be limited to any specific frequency relationships between the various waves.

With reference to the beam waves, it is apparent that their velocities are primarily determined by the beam's D.-C. velocity. As is well known, beam dispersion is a function of the reduced plasma frequency of the beam. The reduced plasma frequency is the natural rate of axially directed oscillation of electrons in a finite beam, and depends primarily on the space-charge density within the beam reduced by the beam geometry and environment.

It is intended that the embodiments described be merely for purposes of illustration. Various other arrangements may be devised by those skilled in the art without departing from the spirit and scope of my invention.

What is claimed is:

1. A high frequency amplifier comprising means for forming and projecting a beam of electrons having fast and slow modes of propagation and noise waves thereon, means for extracting certain fast mode noise waves from said beam, a source of signal frequency wave energy, a source of pump wave energy of substantially twice said signal frequency, means for transferring a first quantity of pump wave energy to the fast mode of said beam, a slow wave circuit for propagating a second quantity of pump wave energy in coupling relationship with the fast mode of said beam, means for causing in-phase coupling between said first and second quantities of pump energy, said slow wave circuit being constructed such that the coupled pump wave travels at a higher velocity than the velocity of uncoupled signal energy on said beam, said slow wave circuit being further constructed such as to propagate signal energy at a velocity substantially equal to the coupled pump wave velocity plus the difference in velocities of the coupled pump wave and uncoupled signal energy on the beam.

2. The high frequency amplifier of claim 1 wherein said signal wave source is connected to said slow wave circuit.

3. The high frequency amplifier of claim 1 wherein said signal wave source is connected to said means for transferring a first quantity of pump energy.

4. A high frequency parametric amplifier comprising means for forming and projecting a beam of electrons having fast and slow modes of propagation, slow wave circuit means for propagating signal energy and pump energy in proximity to said beam, said circuit being so constructed that said pump energy couples with the fast mode of said beam, the velocity of the coupled pump wave being higher than that of uncoupled signal energy propagating along the beam, said beam and circuit comprising means for mixing said pump and signal energies thereby producing a fast mode idler space-charge wave on said beam having a frequency equal to the difference of said pump and signal frequencies, said circuit being further constructed to propagate said signal energy at a velocity substantially equal that of said coupled pump wave plus the difference in velocities of said coupled pump wave and said fast mode idler space-charge wave.

5. A high frequency parametric amplifier comprising means for forming and projecting a beam of electrons having fast and slow modes of propagation, means for transferring signal energy to the fast mode of said beam, slow wave circuit means for propagating pump energy in coupling relationship to the fast mode of said beam, said beam and circuit comprising means for mixing said pump and signal energies thereby producing an idler wave on said circuit having a frequency equal to the difference of said pump and signal frequencies, said slow wave circuit being so constructed that the coupled pump energy travels at a faster velocity than the signal energy on the beam, said circuit being further constructed such that the circuit idler wave travels at substantially the velocity of said coupled pump wave plus the difference in velocities of said coupled pump wave and the signal energy on the beam.

References Cited in the file of this patent

UNITED STATES PATENTS 2,958,001 Ashkin et al. ............ Oct. 25, 1960

OTHER REFERENCES

Wade et al.: "Proceedings of the IRE," January 1959, pages 79–80.